US010730701B1

(12) United States Patent
Westcott et al.

(10) Patent No.: US 10,730,701 B1
(45) Date of Patent: Aug. 4, 2020

(54) SPIRAL CONVEYOR DRUM BAR

(71) Applicant: John Bean Technologies Corporation, Chicago, IL (US)

(72) Inventors: Brian P. Westcott, Sandusky, OH (US); Adam J. Ramsdell, Sandusky, OH (US); Scott M. Kane, Sandusky, OH (US); Ryan C. Harrell, Clyde, OH (US); John J. Bauer, Norwalk, OH (US); Robert C. Brod, Lorain, OH (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 16/379,429

(22) Filed: Apr. 9, 2019

(51) Int. Cl.
*B65G 21/18* (2006.01)
*B65G 17/08* (2006.01)

(52) U.S. Cl.
CPC ........... *B65G 21/18* (2013.01); *B65G 17/086* (2013.01)

(58) Field of Classification Search
CPC .. B65G 21/18; B65G 17/086; B65G 2207/24; B65G 33/34
USPC .......................... 198/663, 676, 677, 687, 778
See application file for complete search history.

(56) References Cited

U.S. PATENT DOCUMENTS

| 5,501,319 | A | * | 3/1996 | Larson | ................. | B65G 17/064 198/778 |
| 9,394,109 | B2 | | 7/2016 | Talsma et al. | | |
| 9,481,523 | B2 | | 11/2016 | Talsma et al. | | |
| 9,815,630 | B1 | * | 11/2017 | Coto | .................... | B65G 17/086 |
| 2011/0056806 | A1 | * | 3/2011 | Johnson | ................. | B65G 21/18 198/778 |
| 2015/0090560 | A1 | | 4/2015 | Talsma et al. | | |
| 2017/0022012 | A1 | * | 1/2017 | Neely | .................. | B65G 17/086 |

FOREIGN PATENT DOCUMENTS

WO 2016179697 A1 11/2016
WO 2017024403 A1 2/2017

OTHER PUBLICATIONS

ISR and Written Opinion of the International Searching Authority, dated Dec. 20, 2019, issued in corresponding International Application No. PCT/US2019/026598, filed Apr. 4, 2019, 13 pages.

* cited by examiner

*Primary Examiner* — Gene O Crawford
*Assistant Examiner* — Lester Ill Rushin
(74) *Attorney, Agent, or Firm* — Christensen O'Connor Johnson Kindness PLLC

(57) ABSTRACT

Spiral conveyors have a drive drum, wherein the drive drum comprises a plurality of drive drum bars connected around an outer perimeter of the drive drum, wherein a drive rod on a drive drum bar is distally located on the outer perimeter of the drive drum, wherein the drive drum bar comprises the drive rod; a face plate; and a support rib, wherein the support rib is connected to the drive rod through standoffs, and the face plate is located between the drive rod and the support rib, and the face plate is separated from the drive rod.

23 Claims, 9 Drawing Sheets

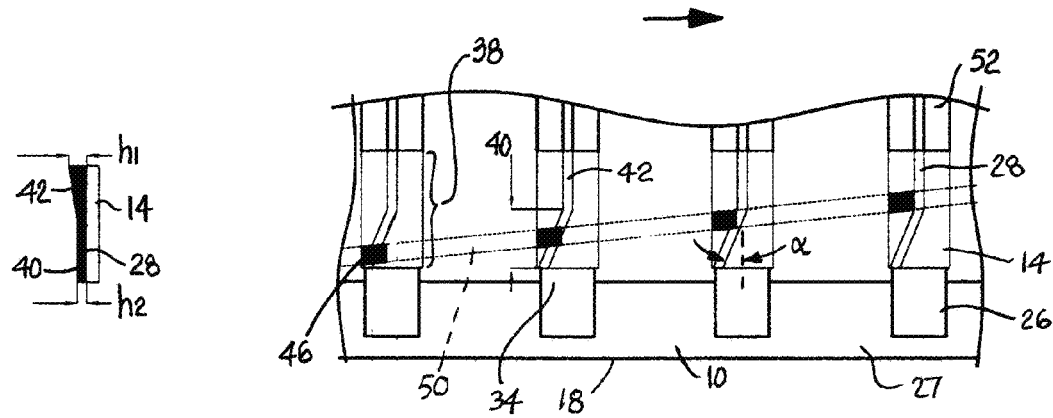
FIG. 2A
*(PRIOR ART)*
FIG. 2B
*(PRIOR ART)*
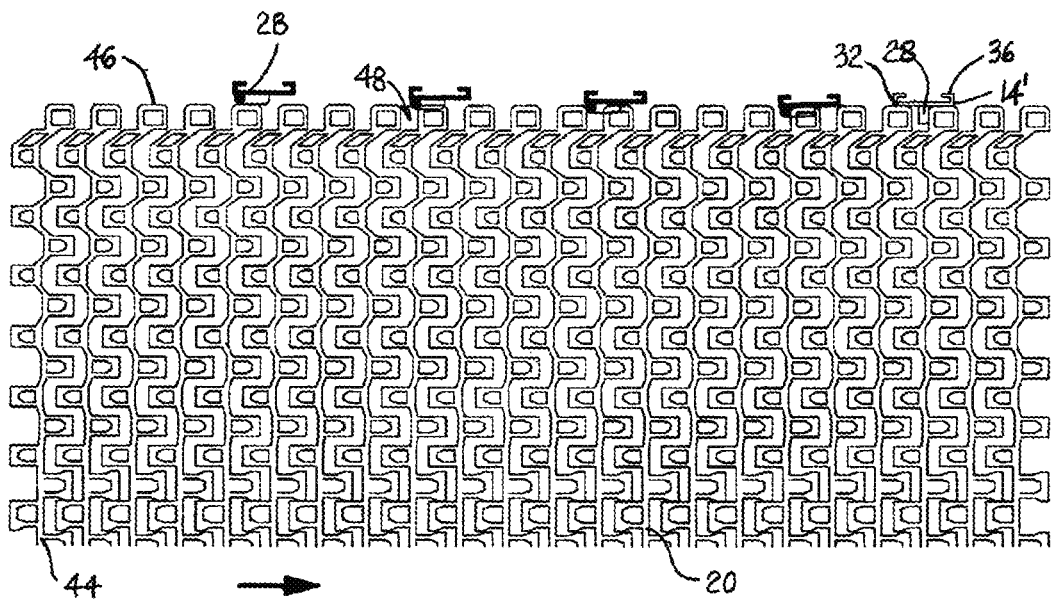
FIG. 2C
*(PRIOR ART)*

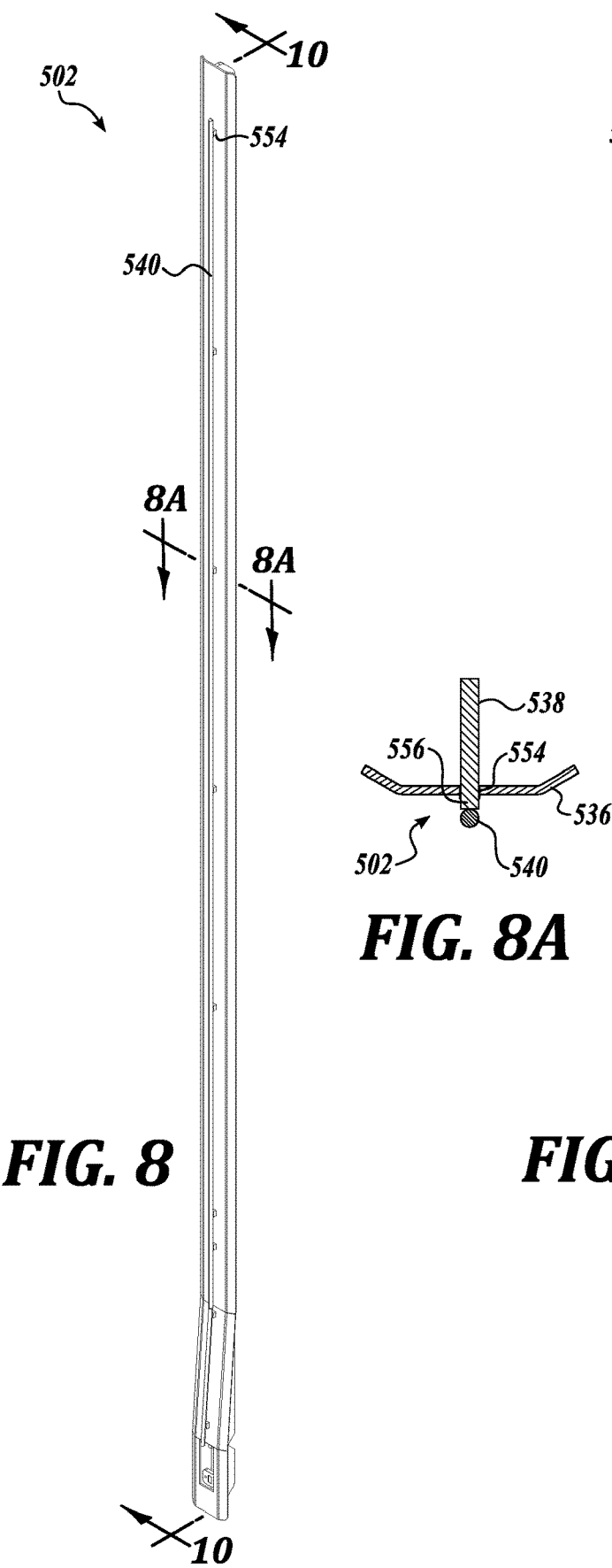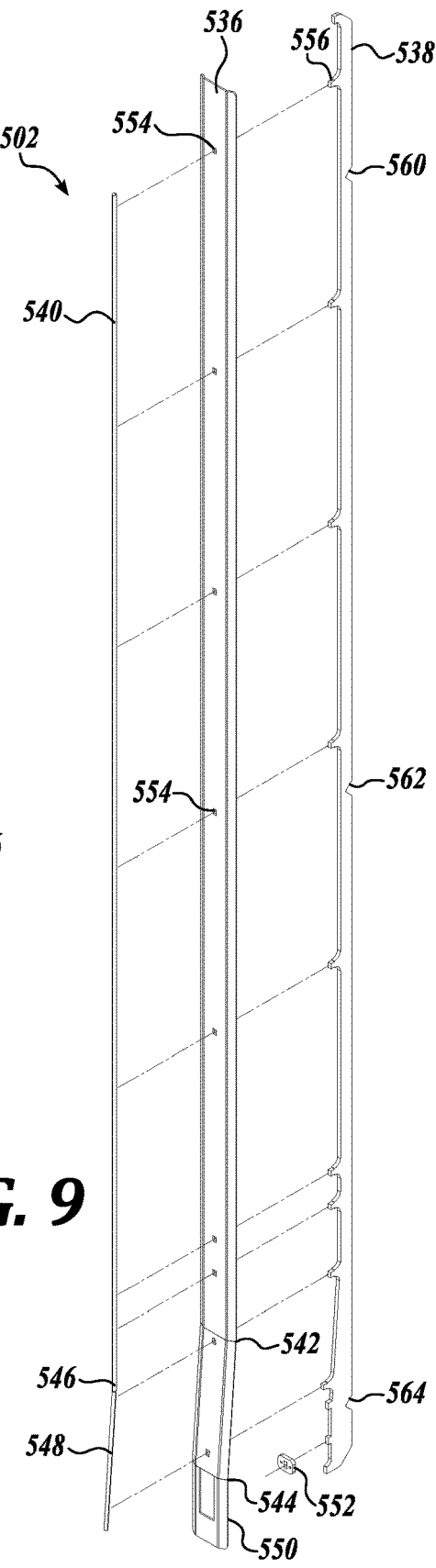
FIG. 8A
FIG. 8
FIG. 9

SPIRAL CONVEYOR DRUM BAR

BACKGROUND

Food producers and packagers are becoming more sensitive to the hygiene of their equipment and a greater focus is being placed on implementation of hygienic designs.

A conveyor generally known in the art as a "direct-drive" or "positive-drive" spiral conveyor is disclosed in U.S. Pat. No. 9,481,523B from which the following description and FIGS. 1-2 (labeled prior art) are provided.

A spiral conveyor is shown schematically in FIG. 1. The spiral conveyor includes a drive tower 10 in the form of a cylindrical drum or cage that is driven to rotate about a vertical axis 12. The rotating tower has a plurality of parallel, generally vertical drive members 14 spaced apart regularly around its periphery 16. Each drive member extends in length between the bottom 18 and the top 19 of the tower. The conveyor belt 20 follows a multi-tiered helical path around the tower. The path is defined by a helical carryway or by a carryway at the bottom and stacker plates mounted on the belt. The inside edge of the belt positively engages the drive members, which drive the belt up the tower as it rotates. The belt travels around various take-up, idle, and feed sprockets 22 as it makes its way from the exit at the top of the tower back to the entrance at the bottom. The tower 10 is mounted at its bottom to a base 24 and is rotated by a motor and gears (not shown).

Each of the drive members 14 comprises a generally vertical rail 26, which is affixed at the bottom 18 to a lower ring 27 of the drive tower 10, and a ridge 28 that protrudes outward of the rail, as shown in FIGS. 2A and 2B. The ridge is shown formed on an overlay 32 that covers the outer face 34 of the rail along just about all its length. As shown in FIG. 2C, tabs 36 hold the overlay to the rail. Instead of being formed on an overlay, the ridge could be welded directly onto the rail or formed monolithically with it.

In a lower segment 38 of each drive member, the ridge 28 includes a constant-height region 40 and a tapered region 42. A constant-height region begins at the bottom of the rail and extends upward to the tapered region. The height of the ridge 28 increases from a height h2 in the constant-height region to a maximum height h1 at the upper end of the tapered region. In other words, the distance of the ridge 28 from the vertical axis 12 (FIG. 1) of the drive tower increases from a constant distance to a greater distance at the upper end of the tapered region. The constant-height region of the lower segment 38 is angled off vertical by an angle .alpha.

The off-vertical orientation and the low height h2 of the ridge in the bottom portion of the lower segment of the drive tower facilitate the entry of the conveyor belt 20 onto the rotating tower, as shown in FIGS. 2B and 2C. The conveyor belt 20 is shown as a modular plastic conveyor belt constructed of a series of rows of belt modules 44 conventionally interconnected row-to-row by hinge rods (not shown). As the belt advances tangentially in to the rotating tower 10, one of its inside edges 46 may contact one of the ridges 28. As the belt is directed more closely toward the drive tower, the ridge eventually slides off the inside edge and into a gap 48 between adjacent belt rows. The angled orientation of the ridge in the lower segment helps guide the belt into proper engagement as it rides along its inclined helical path 50. By the time the belt reaches the tapered region 42 of the lower segment 38 of the drive members, the ridge has assumed a position just upstream of the inside edge of a belt row. In this position, the driving member is engaged with the inside edge of the belt to positively drive it along the helical path 50 without slip. In the tapered region 42, the ridge gradually increases in height to its maximum height h1. The gradual increase further aids in the transition of the belt into full positive engagement with the rotating tower, as indicated by the max-height drive member 14'.

The ridge 28 extends out to the maximum height h1 in an intermediate segment 52 of each drive member 14. In the intermediate segment, the distance of the ridge from the vertical axis 12 (FIG. 1) is constant. The intermediate segment is disposed on the periphery of the drive tower just above the lower segment 38. The intermediate segment constitutes the majority of the height of the tower and, consequently, provides most of the driving engagement with the conveyor belt. The intermediate segment may be vertical as shown or slanted off vertical. Just ahead of the belt's exit from the top 19 of the tower 10, the height of the ridge tapers from the maximum height h1 to zero at the top, as shown in FIGS. 4A and 4B. The tapering occurs in an upper segment 54 of each drive member 14. The top of each rail is affixed to an upper rim 56. The decreasing height of the ridge 28, or its distance from the drive tower's vertical axis, in the upper segment allows the belt to disengage gradually and neatly from the drive members of the rotating tower.

Thus, the spiral conveyor of FIGS. 1-2 positively drives a conveyor belt without overdrive along a helical path with drive members that engage the inside edge of the belt with a ridge that varies in height from the bottom to the top of the rotating spiral drive tower.

Also referring to FIGS. 3 and 4 (labeled prior art) of U.S. Pat. No. 9,394,109, two other embodiments including a drive member 112 and cap 231 are shown.

One embodiment of the present invention provides further improvements to the conventional drive towers and drive members including, but not limited to, utilizing a hygienic design.

SUMMARY

One embodiment of the present invention uses an open profile stainless steel construction method to create the drum bar weldment as the driving element for use in a direct drive spiral belt system. The drive drum bar weldment utilizes a round rod as the driving member welded to standoffs that create a gap between the rod and the face of the drum bar. The non-drive drum bar weldment use the same construction method with the absence of the driving rod.

The unique design of one embodiment of the invention provides a fully welded stainless steel drum bar with no overlapping surfaces and appropriate washout clearances to support a hygienic system design. The round drive rod supported by standoffs along the longitudinal axis of the drum bar provides clearance to sanitize behind the drive rod. Due to these unique characteristics of the design; the harborage areas that once promoted the growth of harmful organisms have been eliminated. This design supports the production of a safer food product for the end consumer.

In one embodiment, a drive drum bar includes an open profile, stainless steel construction method to create the drive drum bar for use in a direct drive spiral belt system. In one embodiment, the drive drum bar utilizes a round rod as the driving member welded to a supporting rib with standoffs that creates a gap between the rod and the face of the drum bar. In one embodiment, the drive drum tower includes alternating drive drum bar weldments and non-drive drum bar weldments. The non-drive drum bar weldment uses the same construction method with the absence of the driving rod attaching the face of the drum bar with a supporting rib.

The drive drum bar weldment and non-drive drum bar weldment are attached on the periphery of the drive tower in an alternating circular pattern to create a cylindrical drive drum tower that in turn will drive the belt of a direct drive belt system.

In one embodiment, a drive drum tower 500 comprises a plurality of drive drum bars 502 connected around an outer perimeter of the drive drum tower, wherein a drive rod 540 on a drive drum bar 502 is outward facing on the outer perimeter of the drive drum tower 500, wherein the drive drum bar 502 comprises: the drive rod 540; a face plate 536; and a support rib 538, wherein the support rib 538 is connected to the drive rod 540, and the face plate 536 is located between the drive rod 540 and the support rib 538, and the face plate 536 is separated from the drive rod 540.

In one embodiment of the drive drum tower 500, the drive drum tower 500 comprises non-drive drum bars 504 alternating with drive drum bars 502 around the outer perimeter of the drive drum tower 500, wherein a non-drive drum bar 504 comprises: a face plate 536; and a support rib 538, wherein the support rib 538 is connected to the face plate 536, and the non-drive drum bar 504 does not have a drive rod 540. In one embodiment, the support rib 538 is connected to the face plate 536 through standoffs 556.

In one embodiment of the drive drum tower 500, the drive rod 540 is straight in a front plane and sloping in a side plane, wherein a sloping section 548 is provided at a lower end of the drive rod 540.

In one embodiment of the drive drum tower 500, the drive drum tower 500 comprises a central post 506, and the drive drum bars 502 are connected on the drive drum tower 500 parallel to the central post 506.

In one embodiment of the drive drum tower 500, the support rib 538 of a drive drum bar 502 is connected to a plurality of rings 516, 522, 524, wherein the plurality of rings are connected to the central post 506.

In one embodiment of the drive drum tower 500, the rings 516, 522, 524 are made from angle steel having a vertex pointing outward, and the support rib 538 includes wedge cutouts 560, 562, 564 to match with the vertices of the rings 516, 522, 524.

In one embodiment of the drive drum tower 500, each of the rings 516, 522, 524 is connected to the central post 506 through radial arms 514, and the drive drum tower 500 further comprises vertical braces 526 or diagonal braces 528, 530 connected between the radial arms of one ring to a second ring.

In one embodiment of the drive drum tower 500, the drive drum tower 500 comprises standoffs 556, wherein the face plate 536 is separated from the drive rod 540 through standoffs 556.

In one embodiment of the drive drum tower 500, a standoff 556 has a step 558 that abuts against a hole 554 in the face plate 536.

In one embodiment of the drive drum tower 500, the support rib 538 is welded to the drive rod 540 and face plate 536 at the standoffs 556.

In one embodiment of the drive drum tower 500, the drive drum tower 500 comprises extended gaps between the drive rod 540 and face plate 536 throughout the length of the drive drum bar 502.

In one embodiment of the drive drum tower 500, the drive rod 540 has a circular or polygonal cross-sectional shape.

In one embodiment of the drive drum tower 500, the face plate 536 is made from channel steel. In one embodiment, a drive drum bar 502 comprises: a drive rod 540; a face plate 536; and a support rib 538, wherein the support rib 538 is connected to the drive rod 540, and the face plate 536 is located between the drive rod 540 and the support rib 538, and the face plate 536 is separated from the drive rod 540.

In one embodiment of the drive drum bar 502, the drive rod 540 is straight in a front plane and sloping in a side plane, wherein a sloping section 548 is provided at an end of the drive rod 540.

In one embodiment of the drive drum bar 502, the drive drum bar 502 comprises standoffs 556, wherein the face plate 536 is separated from the drive rod 540 through standoffs 556.

In one embodiment of the drive drum bar 502, a standoff 556 has a step 558 that abuts against a hole 554 in the face plate 536.

In one embodiment of the drive drum bar 502, the support rib 538 is welded to the drive rod 540 and face plate 536 at the standoffs 556.

In one embodiment of the drive drum bar 502, the drive rod 540 has a circular or polygonal cross-sectional shape.

In one embodiment of the drive drum bar 502, the face plate 536 is made from channel steel.

In one embodiment of the drive drum bar 502, the drive drum bar 502 comprises gaps between the face plate 536 and the support rib 538.

In one embodiment, a spiral conveyor comprises: a drive drum tower 500 comprises a plurality of drive drum bars 502 connected around an outer perimeter of the drive drum tower, wherein a drive rod 540 on a drive drum bar 502 is outward facing on the outer perimeter of the drive drum tower 500, wherein the drive drum bar 502 comprises: the drive rod 540; a face plate 536; and a support rib 538, wherein the support rib 538 is connected to the drive rod 540 through standoffs 556, and the face plate 536 is located between the drive rod 540 and the support rib 538, and the face plate 536 is separated from the drive rod 540, and a conveyor 20 having a lateral side engaged to the plurality of drive drum bars 502, wherein the conveyor 20 is arranged in a spiral around the drive drum tower 500.

In one embodiment, a drive drum bar 502 for a drive drum tower 500 comprises a drive rod 540; a face plate 536; and a support rib 538, wherein the support rib is connected to the drive rod, and the face plate is located between the drive rod and the support rib, and the face plate is separated from the drive rod, wherein the drive drum bar is capable of being attached to the outer perimeter of the drive drum tower, wherein the drive rod faces outwardly.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2A is a diagrammatical illustration of a drive member from U.S. Pat. No. 9,481,523;

FIG. 2B is a diagrammatical illustration of drive members from U.S. Pat. No. 9,481,523;

FIG. 2C is a diagrammatical illustration of a spiral conveyor from U.S. Pat. No. 9,481,523;

FIG. 8 is a diagrammatical illustration of a drive drum bar according to one embodiment of the present invention;

FIG. 8A is a diagrammatical cross-sectional illustration of the drive drum bar of FIG. 8;

FIG. 9 is a diagrammatical exploded view illustration of the drive drum bar of FIG. 8;

DETAILED DESCRIPTION

Conventional drive members of drive towers are in need of improvement with respect to having a more hygienic design. A conventional design for driving the conveyor belt utilizes plastic caps fitted over stainless steel tube. The overlapping surfaces of the cap as well as the hollow void of the tube provide hygienic concerns due to the harborage areas created for growth of harmful organisms such as *Salmonella* or *Listeria*. These organisms are responsible for multiple food safety recalls every year.

The present disclosure is related to drive drum towers, drive drum bar weldments, and non-drive drum bar weldments. In one embodiment, the drive drum bar of the present invention can be used in place of "drive members" 14, and caps 231 of U.S. Pat. Nos. 9,394,109B and 9,481,523B, for example. However, while U.S. Pat. Nos. 9,394,109B and 9,481,523B are given as examples, the use of the disclosed drive towers, drive drum bars, and non-drive drum bars is not limited solely to such uses.

Figure 5:
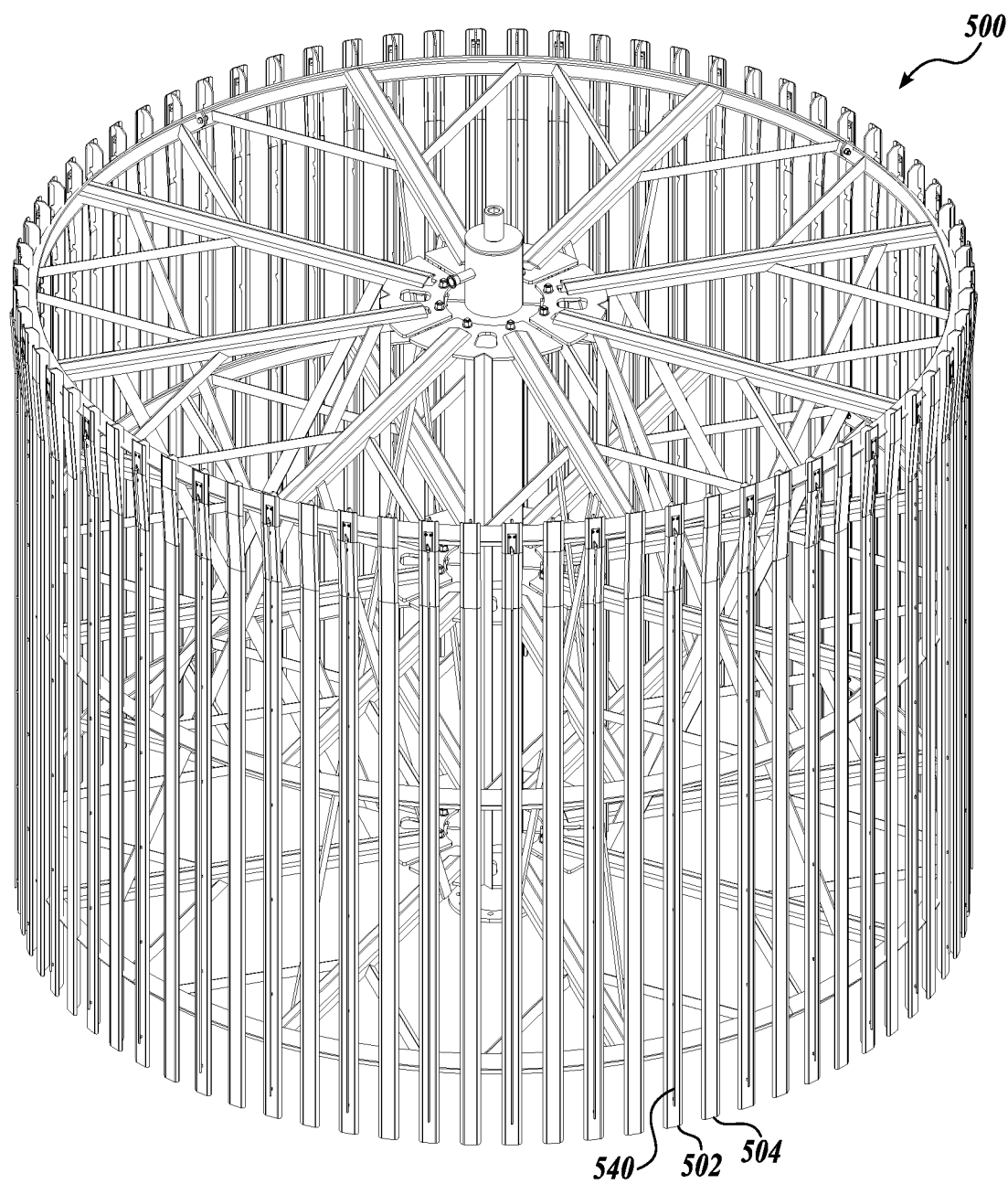
FIG. 5 is a diagrammatical illustration of a drive drum tower according to one embodiment of the present invention.

Referring to FIG. 5, one embodiment of a drive drum tower 500 is illustrated. In one embodiment, the drive drum tower 500 is for positively driving a conveyor, such as a spiral conveyor, by rotating the drive drum tower 500 around its central axis. The drive drum tower 500 includes drive drum bars 502 and non-drive drum bars 504 in an alternating configuration arranged in a circular pattern around the outer perimeter of the drive drum tower 500. In one embodiment, there are open spaces separating each of the drive drum bars 502 from the non-drive drum bars 504. In one embodiment the outer perimeter of the drive drum tower 500 can be continuous and without spaces. Drive rods 540 on the drive drum bars 502 are arranged so as to project radially outward at the outer perimeter of the drive drum tower 500. By projecting outward, the drive rods 540 can engage with a spiral conveyor (not shown in FIG. 5). The drive drum tower 500 is used, in one embodiment, to drive a conveyor in a spiral to carry items from a lower elevation to a higher elevation or vice versa. However, the drive drum tower 500 is not limited to any one particular conveyor system. Furthermore, it should be understood that conveyor systems are generally complex machines. Therefore, for purposes of this disclosure, all the conveyor parts need not be illustrated. The present drive drum tower 500, drive drum bars 502, and non-drive drum bars 504 can be used to replace conventional, less hygienic equipment in a conveyor, such as a spiral conveyor or otherwise. Spiral conveyors can be used in freezers or ovens, for example. One use of a spiral conveyor is for the transfer of food intended for human consumption. Reference may be made to the above-mentioned patents for a fuller general description of spiral conveyor design.

The overall diameter and height of the drive drum tower 500 will depend on the particular application. In one embodiment, the drive drum tower 500 is constructed around a central post 506. The central post 506 may be driven around an axis of rotation by an electric motor and a gearbox or a chain and sprocket, for example. The drive drum tower 500 axis of rotation may be vertical or horizontal or any angle between vertical to horizontal.

The central post 506 can be made from one or more cylindrical or non-cylindrical tubes or rods, for example. The central post 506 can be made from a tube within a tube or from various tube sections of different radiuses with steps between the various sections. In one embodiment, the central post 506 is designed to accommodate a rotating water header mounted on the top which supports a spray header used for cleaning.

Figure 6:
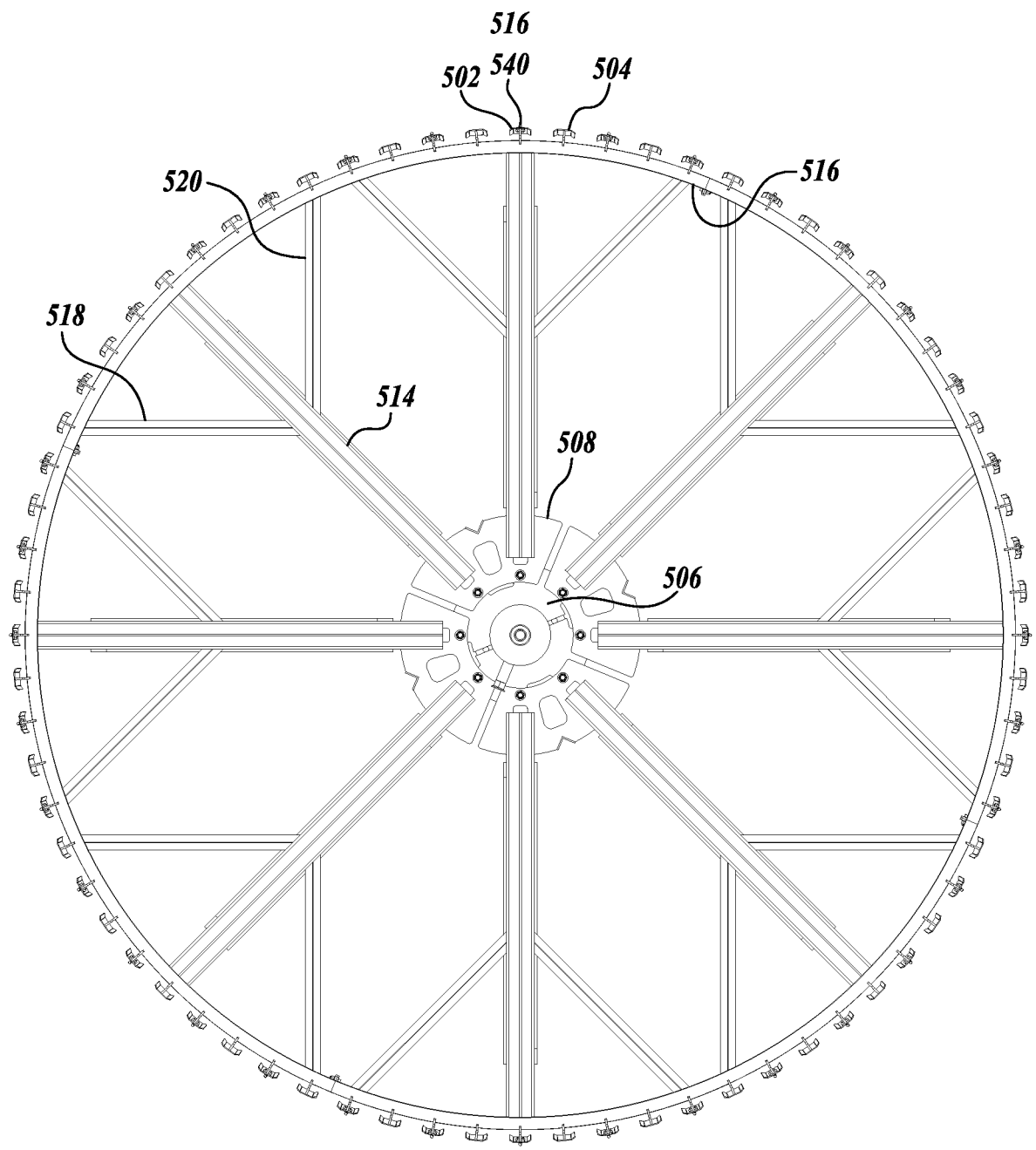
FIG. 6 is a diagrammatical top view illustration of the drive drum tower of FIG. 5.

Referring to FIG. 6, in one embodiment, the drive drum tower 500 uses open structural members, such as flanges 508, 510, 512, radial arms 514, spreader arms 518,520, diagonal braces 528, 530, vertical braces 526, and rings 516, 522, 524 to support the drive drum bars 502 and non-drive drum bars 504 on the circumference of the drive drum tower 500. However, depending on the size or application of a particular drive drum tower 500, not all structural members will be used, and in very large drive drum towers additional structural members might be necessary. In one embodiment, the drive drum tower 500 can simply be made from disks supporting a continuous cylindrical tube. However, when the size of the drive drum tower 500 precludes a simple tube design because of weight, the use of alternative weight-minimizing support structures is advantageous.

In the present drive drum tower 500 design, a drum-like cage is made from the radial arms 514, spreader arms 518,520, diagonal braces 528, 530, vertical braces 526, and rings 516, 522, 524, as will be described. Generally, all structural parts of the drive drum tower 500 will be metal, such as stainless steel alloys or aluminum alloys. In one embodiment, the materials of construction and construction methods of the drive drum tower 500 will be approved for food intended for human consumption. The attachment of the flanges 508, 510, 512, radial arms 514, spreader arms 518,520, diagonal braces 528, 530, vertical braces 526, and rings 516, 522, 524 to the central post 506 and to each other may be via welding or bolts or a combination of welding and bolts. Structural members, such as flanges 508, 510, 512, radial arms 514, spreader arms 518,520, diagonal braces 528, 530, vertical braces 526, and rings 516, 522, 524 can be designed for strength while reducing weight; therefore, the flanges 508, 510, 512, radial arms 514, spreader arms 518,520, diagonal braces 528, 530, vertical braces 526, and rings 516, 522, 524 may have cutouts or be hollow for reducing weight, and may employ I-beam, angle, channel, or box construction for strength while reducing weight. More specifically, the radial arms 514, spreader arms 518,520, diagonal braces 528, 530, vertical braces 526, and rings 516, 522, 524 described herein can be hollow tubes of any shape or have flat, beam, angle, or channel construction. Furthermore, the drive drum tower 500 may be constructed in sections, such as quarter sections, and in final assembly, all the sections are assembled. A description of a construction method for a section of the drive drum tower 500 is provided with the understanding that the same can be replicated for the remainder of the drive drum tower 500.

Figure 7:
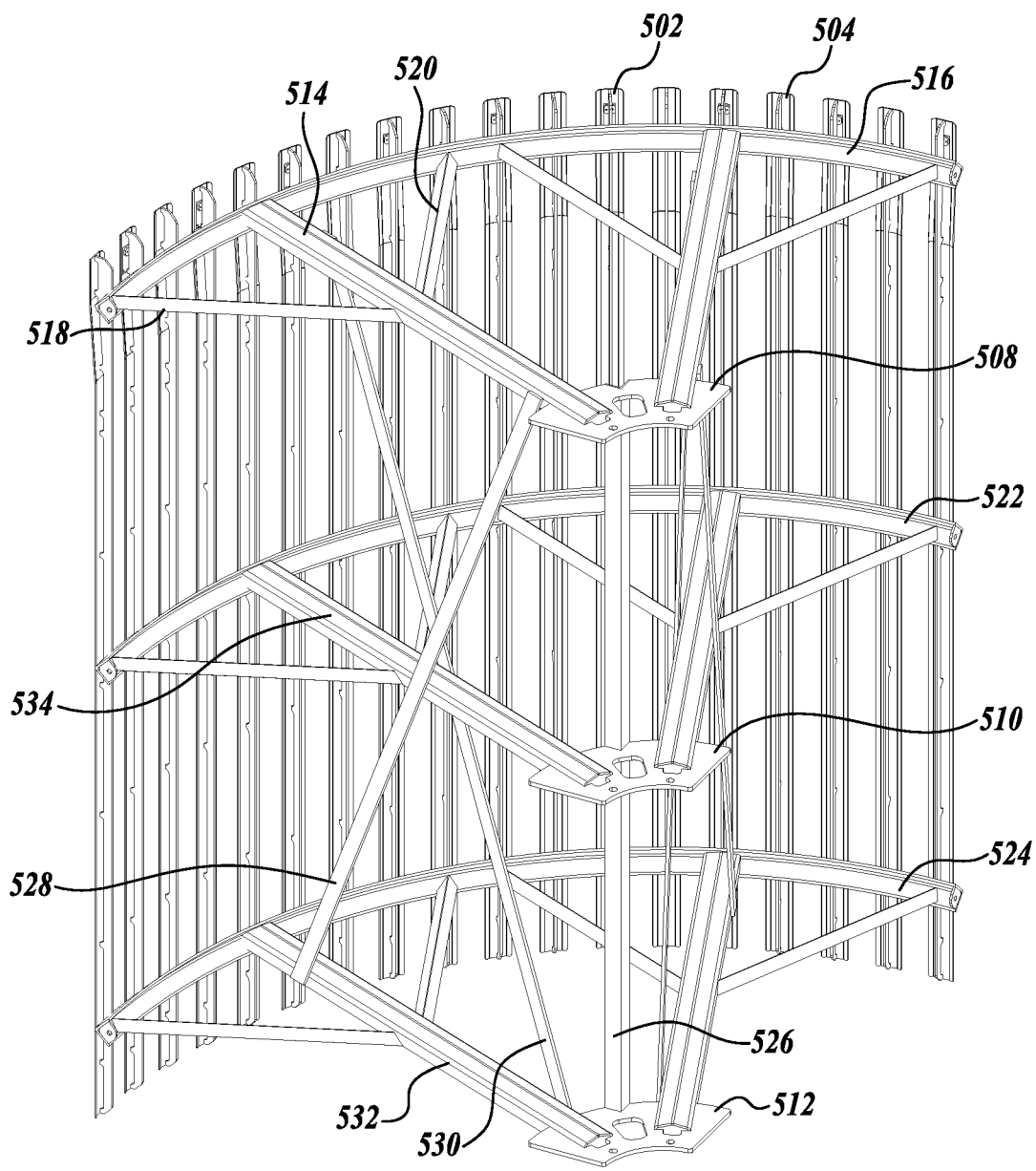
FIG. 7 is a diagrammatical cross-sectional illustration of the drive drum tower of FIG. 5.

Referring to FIGS. 6 and 7, the drive drum tower 500 has flanges 508, 510, and 512 connecting the central post 508 to other structural members. In one embodiment illustrated in FIG. 7, the drive drum tower 500 includes flanges 508, 510, and 512 placed generally at the top, middle, and bottom of the central post 506. However, depending on the length of the central post 506, there may be more or fewer flanges along the length of the central post 506. The flanges 508, 510, and 512 extend radially out from the central post 506 in all directions. The flanges 508, 510, and 512 may be continuous around the central post 506 or the flanges 508, 510, and 512 may be divided into halves or quarters, for example. The flanges 508, 510, and 512 are generally defined by an inner and outer radius. The distance separating the inner radius from the outer radius will generally be greater than the thickness of the flanges 508, 510, and 512, where thickness is the dimension measured along the axial direction of the central post 506. As illustrated in FIG. 6, four flange quarters are illustrated making up the top flange 508. A flange 508 quarter can be bolted to the top end of a step in the cylindrical tube of the central post 506.

Radial arms, such as radial arm 514, are like spokes on a wheel. The proximal end of the radial arm 514 is attached to an upper surface of the flange 508, while the opposite distal end of the radial arm 514 is attached to the inside proximal surface of a first ring 516. Each flange 508 quarter may have two such radial arms, resulting in eight radial arms for flange 508 as seen in FIG. 6. The eight radial arms are preferably equally spaced resulting in an angle of 45 degrees between adjacent radial arms. The central post 506 also has flanges 510 and 512 at the middle and bottom of the central post 506. Middle and bottom flanges 510 and 512 may also each have eight radial arms extending radially to connect to a corresponding middle ring 522 and lower ring 524, respectively. In one embodiment, the radials arms of the rings 516, 522, and 524 are aligned in the same plane, for example, radial arm 514 is directly above the radial arm 534 and radial arm 532.

The flanges 508, 510, and 512 and their corresponding rings 516, 522, and 524 are generally at the same axial distance so that the radial arms connecting the flanges 508, 510, and 512 to the rings 516, 522, and 524 will generally lie at right angles with respect to the central post 506. Therefore, the flanges 508, 510, 512 and rings 516, 522, 524 can lie in or about the same spatial plane. In one embodiment, each ring 516, 522, and 524 has the same radius from the central post 506. In one embodiment, the rings 516, 522, and 524 may differ in radius. For example, the lower section of the drive drum tower 500 may have a greater radius, while the upper section of the drive drum tower 500 may have a smaller radius. Increasing or decreasing the radius of the drive drum tower 500 may assist with engaging and disengaging the conveyor. In one embodiment, a particular ring design for rings 516, 522, and 524 uses angle steel with the vertex pointing outward as illustrated in the cross-section of FIG. 7.

Referring to FIG. 6, spreader arms, such as spreader arms 518 and 520 assist to distribute the load from the single radial arm 514 to two additional points on the ring 516, which helps maintain the circularity of the perimeter of the drive drum tower 500. In one embodiment, each radial arm 514 includes a pair of spreader arms 518, 520. In one embodiment, spreader arms 518, 520 are each attached to the radial arm 514 at the same radial distance. In one embodiment, spreader arms 518, 520 are each attached to the radial arm 514 at acute angle and extend at that angle until reaching the ring 516, but on opposite sides of the radial arm 514. The length of the arc defined between the contact points of the spreader arms 518, 520 to the ring 516 is less than $2\pi r/8$ or an angle not more than 45 degrees if each radial arm is to have a pair of spreader arms. However, as seen in FIG. 6, there is a small gap between the spreader arms 518 and 520 and the adjacent spreader arms. Spreader arms, such as spreader arms 528 and 520 can be provided on every radial arm.

Referring to FIG. 7, a vertical brace 526 is attached to the outer perimeter at each of the top 508, middle 510, and bottom 512 flanges. In one embodiment, there is one vertical brace 526 for each flange quarter of each of the flanges 508, 510, and 512. The vertical brace 526 is placed between the two radial arms of each flange quarter.

Still referring to FIG. 7, a first diagonal brace 528 is connected at the distal side of a lowermost radial arm 532. The diagonal brace 528 extends toward and is connected at the proximal side of the uppermost radial arm 514. A second diagonal brace 530 is connected at the proximal side of the lowermost radial arm 532. The diagonal brace 530 extends toward and is connected at the distal side of the uppermost radial arm 514. In one embodiment, the first diagonal brace 528 is placed on one lateral side of the lowermost 532, middle 534, and uppermost 514 radial arms, and the second diagonal brace 530 is placed on the other lateral side of the lowermost 532, middle 534, and uppermost 514 radial arms so that the two diagonal braces 528, 530 do not touch. However, in one embodiment, both the first 528 and second 530 diagonal braces are placed on the same lateral side of the radial arms 532, 534, and 514, so that the two diagonal braces 528 and 530 touch and are connected to each other. Whether the diagonal braces 528 and 530 are placed on the same side or on different sides, the diagonal braces 528 and 530 can be attached to the middle radial arm 534 and to one another. In one embodiment, for every group of vertically aligned radial arms, such as 532, 534, 514, a pair of diagonal braces, such as 528, 530, is provided to link the radial arms.

The above-described construction method of a section of the drive drum tower 500 using flanges 508, 510, 512, radial arms 514, 534, 532, spreader arms 518, 520, vertical braces 526, and diagonal braces 528, 530, around the central post 506, can be replicated in all directions to achieve a cage frame resembling a drum of desired height and diameter to which the drive drum bars 502 and non-drive drum bars 504 can be added around the outer perimeter of the cage frame.

Referring to FIGS. 5 and 7, and to the particular detail of the use of angle steel for rings 516, 522, and 524, it can be seen that the alternating pattern of drive drum bars 502 and non-drive drum bars 504 are connected to rings 516, 522, and 524 at the outward pointing vertices of the rings 516, 522, and 524. The drive drum bars 502 and the non-drive drum bars 504 can be welded or bolted to the rings 516, 522, and 524. In one embodiment, the drive drum bars 502 and non-drive drum bars 504 are connected to rings 516, 522, and 524 so that the drive drum bars 502 and non-drive drum bars 504 are perpendicular to the rings 516, 522, 524 and parallel with the central post 506. Other embodiments may have the drive drum bars 502 and non-drive drum bars in other configurations other than vertical.

Figure 4:
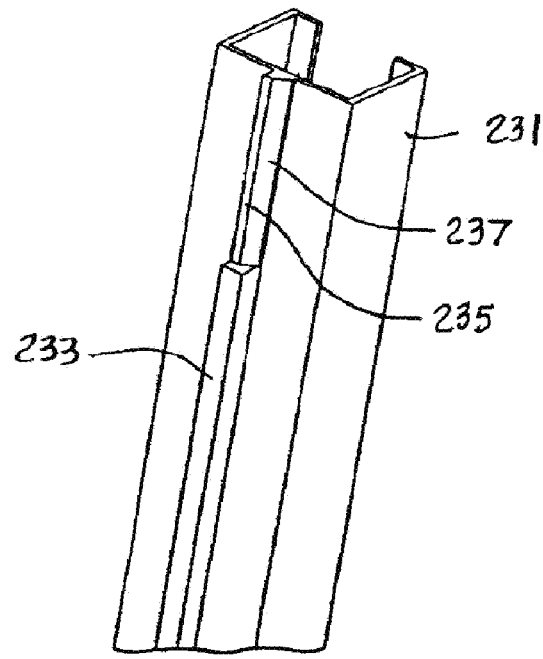
FIG. 4 is a diagrammatical illustration of a drive member from U.S. Pat. No. 9,394,109.

Referring to FIGS. 7, 8, 8A, and 9, one representative drive drum bar 502 will be described with the understanding that all drive drum bars can be similar. In one embodiment, each drive drum bar 502 can be fabricated from a face plate 536, support rib 538, and drive rod 540. Other embodiments may use more or fewer components. The preferred method for joining the components are welding; however, bolts can be used or the combination of welding and bolts. The face plate 536, support rib 538, and drive rod 540 can each be a monolithic part before welding or bolting to each other. The drive rod 540 is the part that engages with a conveyor, for example, the conveyor 20 of FIG. 2C. In FIG. 2C, the part 28 (ridge) engages with the conveyor 20 to positively drive the conveyor 20. In one embodiment, the drive drum bars 502 can replace the prior art drive member 14 (FIGS. 1 and 2), and drive member 231 (FIG. 4).

Figure 1:
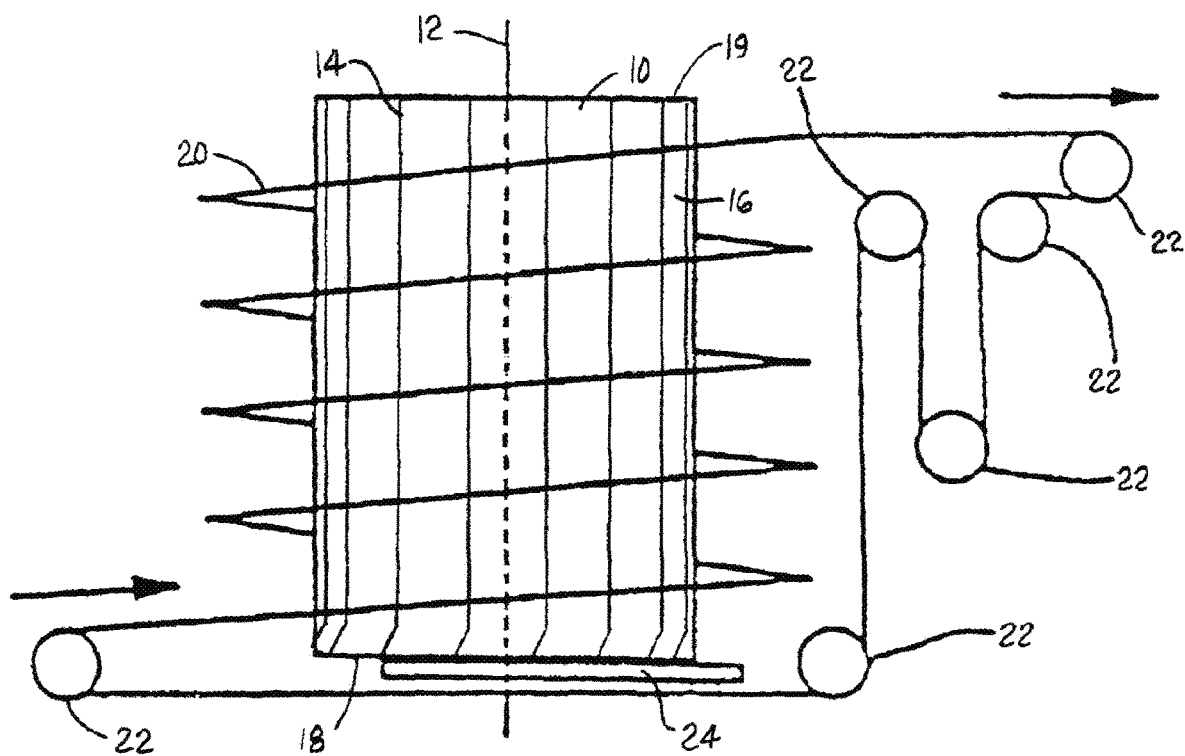
FIG. 1 is a diagrammatical illustration of a "positive-drive" or "direct drive" spiral conveyor from U.S. Pat. No. 9,481,523.
Figure 3:
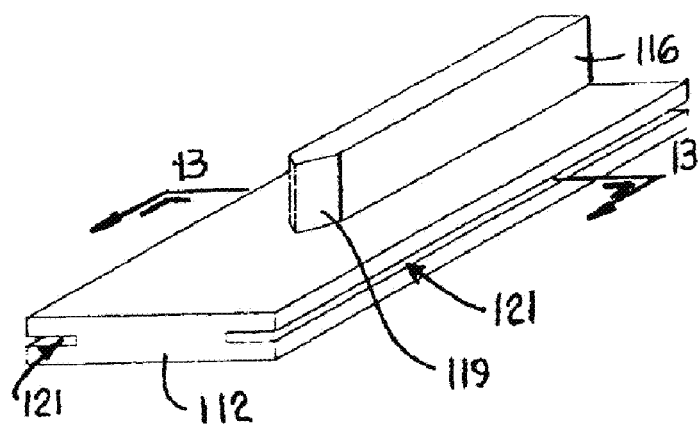
FIG. 3 is a diagrammatical illustration of a drive member from U.S. Pat. No. 9,394,109.

Embodiments of the drive rod 540 can include, but are not limited, to a range of 0.25 inches to 0.375 inches in diameter or thickness. Embodiments of the drive rod 540 can be hollow or solid, and the cross-sectional shape can be any closed shape, such as circular, elliptical, and polygonal, such as rectangular and square. Referring to FIG. 9, one embodiment of a drive rod 540 is straight in the front plane, but bent in the side plane. For example, the drive rod 540 is bent outward at corner 546 in the side plane. Therefore, for the majority of the drive rod 540 length corresponding to the drive drum tower 500 height, the drive rod 540 will be at the same radial distance, and the maximum radial distance will be at the very end of the drive rod 540. A sloping section 548 of the drive rod 540 transitions from the maximum radial distance to the remainder of the drive rod 540. Therefore, when a conveyor is starting to become engaged, the drive rod 540 is further radially outward on the drive drum tower 500. Other embodiments of the drive rod 540 can be bent in the frontal plane, for example, as shown in FIG. 1 the drive members 14 are bent counterclockwise in the front plane. Other embodiments of the drive rod 540 can be bent in the side plane at the top end of the drive rod 540 to reduce the radial distance when the conveyor disengages, and other embodiments of the drive rod 540 can be bent in both the frontal and side planes, for example, drive rods 540 can have a spiral component throughout the entire length of the drive rod as shown in FIG. 16 of U.S. Pat. No. 9,481,523. Face plate 536 and support rib 538 can conform to the shape of the drive rods 540. Embodiments of the drive rod 540 can be bent in the front and side planes, however, a feature of the present drive rod 540 is to separate the drive rod 540 from the front surface of the face plate 536 through a minimal use of standoffs, as is described herein, to provide extended gaps between the front surface of the face plate 536 and the back side of the drive rod 540. As compared to the driving members of the prior art shown in FIGS. 2C, 3, and 4 that have the entire length of the ridge in intimate contact with the face plate, the present drive drum bars 502 have a design that is easier to maintain clean and therefore, more hygienic for use in food applications.

Referring to FIG. 8A, in one embodiment, the face plate 536 is made from shallow channel steel, where the sides of the channel are pointed inward at an angle less than ninety degrees. The face plate 536 is straight in the front plane, but bent in the side plane to match the bend in the drive rod 540. As seen in FIG. 9, the lower end of the face plate 536 includes a first outward bend at corner 542 and a second inward bend at corner 544. The first bend at corner 542 corresponds with the bend in the drive rod 540 at corner 546. The face plate 536 similarly has a sloping transition from the first corner 542 to the second corner 544. In one embodiment, the drive rod 540 terminates at the corner 544 of the face plate 536. However, in other embodiments, the drive rod 540 can continue below the sloping section 548. Below the second inward bend at corner 544, the face plate 536 becomes parallel in the side plane to the rest of the face plate 536 above the first outward corner 542. The end piece 550 of face plate 536 below corner 544 can be secured to the end of the support rib 538 with clasp 552.

Referring to FIG. 9, the face plate 536 is provided with a plurality of holes 554 along the length of the face plate 536. The location and quantity of the holes 554 may depend on the particular application and the anticipated loads on the drive rod 540. The support rib 538 is provided with a similar number of standoffs 556 corresponding to the position and number of holes 554 on the face plate 536. In one embodiment, the standoffs 556 are not a separate component of the support rib 538, but, can be integrally formed with the support rib 538. In one embodiment, the support ribs 538 can be distinct components that require joining to the support rib 538. The support rib 538 is at least as long as the face plate 536 to provide a standoff 556 in each of the holes 554. In one embodiment, the support rib 538 is made of elongated plate steel, such that when it is assembled on the drive drum bar 502, the width of the support rib 538 in the radial direction will be greater than the thickness. In the side plane, the outward facing side profile of the support rib 538 can generally follow the shape of the face plate 536 so that the support rib 538 has a sloping section where the face plate 536 also has a sloping section. The inward facing side profile of the support rib 538 will match with the rings 516, 522, and 524, because the support rib 538 is connected to the rings 516, 522, and 524. Therefore, when rings 516, 522, and 524 all have a similar radius, the inward facing side profile of the support rib 538 will generally be straight.

Figure 10:
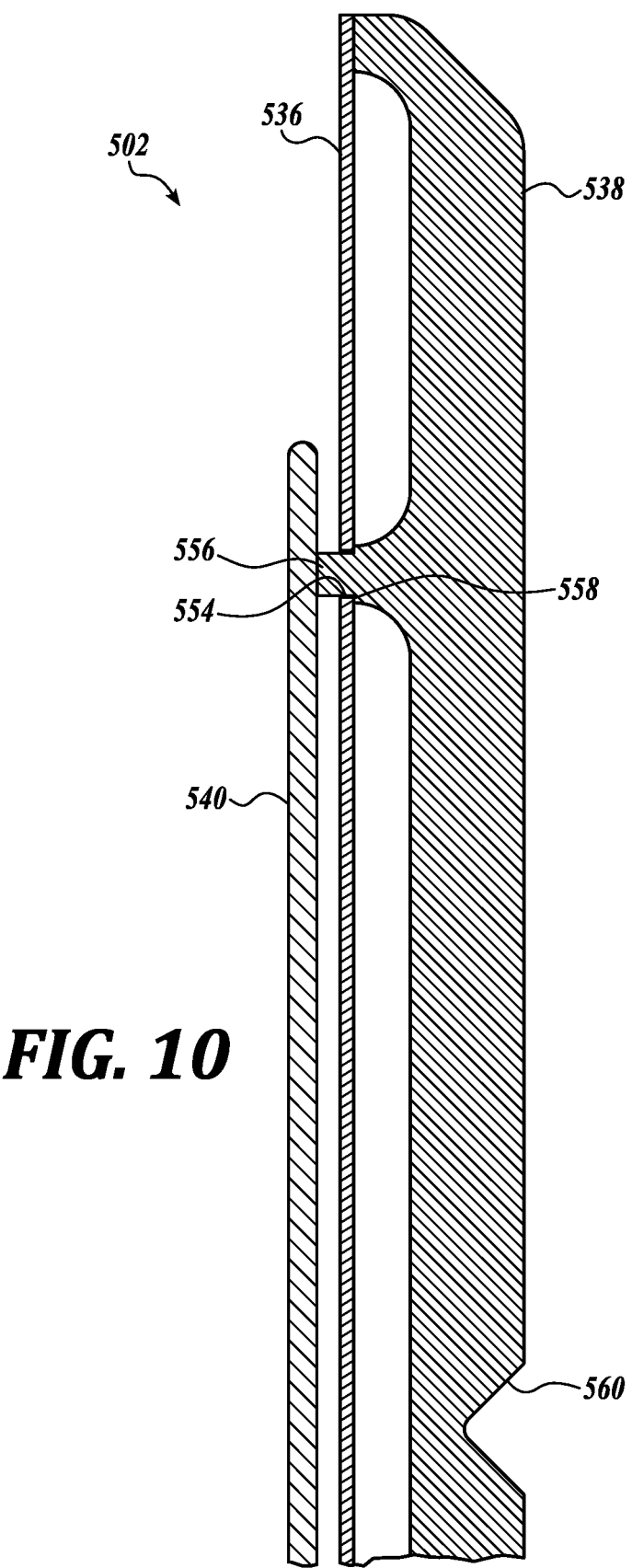
FIG. 10 is a diagrammatical cross-sectional detail illustration of the drive drum bar of FIG. 8.

As illustrated in FIG. 10, the support rib 538 is nearest to the central post 506, and the drive rod 540 is farthest from the central post 506. The face plate 536 is placed between the drive rod 540 and the support rib 538 so that the standoffs 556 pass through the holes 554 so that the ends of the standoffs 556 are attached to the drive rod 540, thereby attaching the drive bar 540, face plate 536, and support rib 538 into a unit. The standoffs 556 and holes 554 can have a square or circular cross section, for example. In one embodiment, the standoffs 556 are provided with a step 558 greater in diameter than the hole 554 to abut against the proximal side of the hole 554 to allow a pre-defined length of standoff 556 to pass through the hole 554 to the drive rod 540. Such pre-defined length after the step 558 is greater than the thickness of the face plate 536 to extend the standoff 556 above the face plate 536 and provide a gap between the face plate 536 and the drive rod 540. The standoff 556 can be welded both to the drive rod 540 and the face plate 536. The same is repeated for other standoffs provided on the support rib 538. The gap extending between the face plate 536 and drive rod 540 can include, but are not limited, to a range of 2 inches to 16.5 inches in length. This gap length corresponds to the distance between adjacent standoffs 556. The distance or offset between the face plate 536 and drive rod 540 can include, but is not limited, to a range of 0.09 inches to 0.25 inches. The gap width corresponding to the thickness of the support rib 538 can include, but is not limited, to a range of 0.25 inches to 0.375 inches. Further, the gaps can comprise more than 90% of the total length of the drive rod 540.

Although three major parts are described to construct the drive drum bar 502 via welding, the construction methods to achieve the drive drum bar 502 can be varied. For example, it may be possible to use a 3-D printing process to create a monolithic drive drum bar 502 without welding or assembly of various parts.

As mentioned, the rings 516, 522, and 524 can be made from angled steel with the vertices pointing outward. Referring to FIG. 9, the proximal side of the support rib 538 has wedge cutouts 560, 562, and 564 that match the profile of the vertex of the rings 516, 522, 524 so that the support rib 538 can be welded or bolt to the rings 516, 522, and 524.

Figures 11, 12:
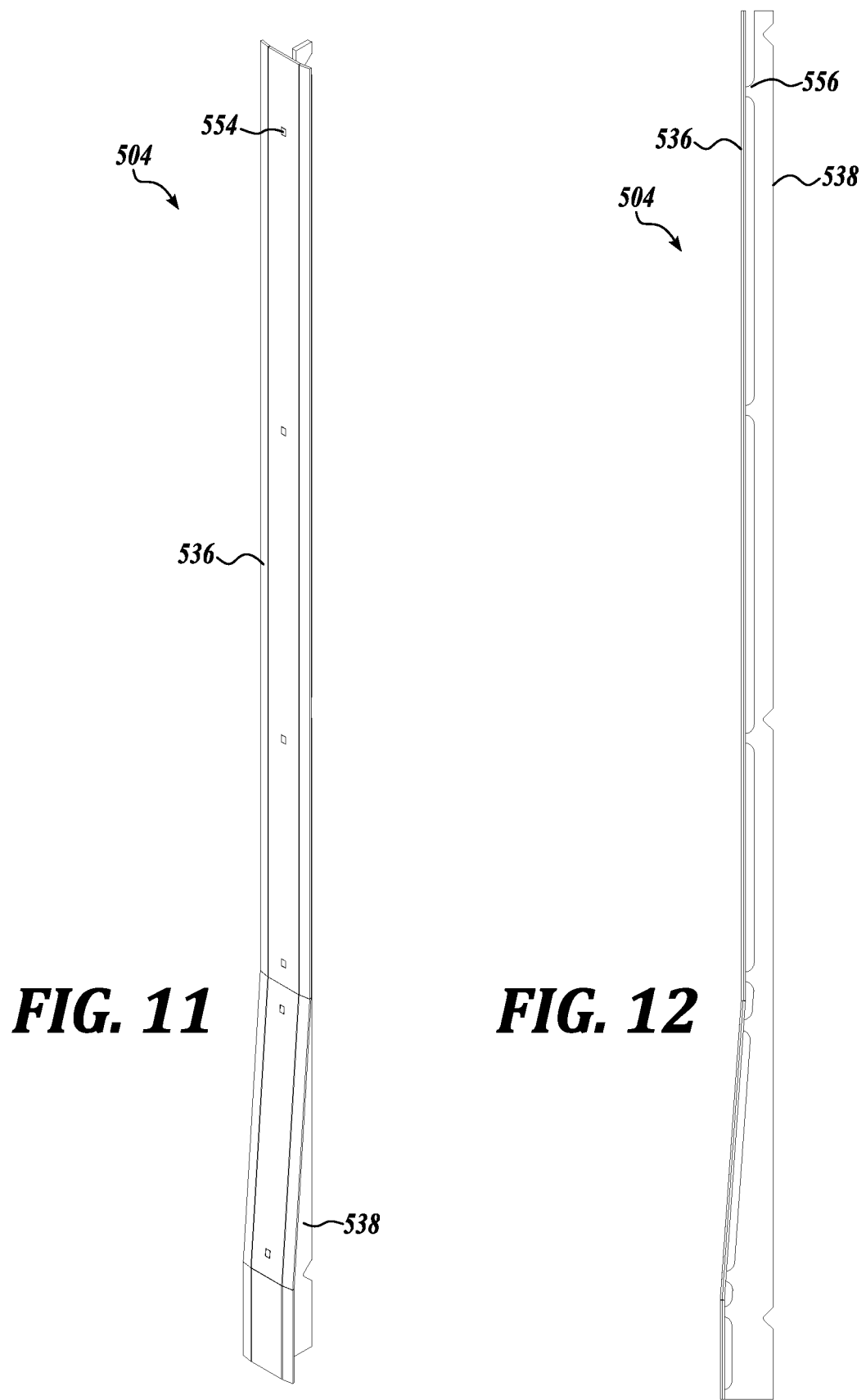
FIG. 11 is a diagrammatical illustration of a non-drive drum bar according to one embodiment of the present invention.
FIG. 12 is a diagrammatical illustration of the non-drive drum bar of FIG. 11.

FIGS. 11-12 illustrate a non-drive drum bar 504 made from a support rib 538 and face plate 536. The non-drive drum bar 504 does not include a drive rod 540. The support rib 538 and face plate 5536 of the non-drive drum bar 504 are similar in construction and materials to the support rib 538 and face plate 536 of the drive drum bar 502. However, the standoffs 556 on the support rib 538 of the non-drive drum bar 504 are not connected to a drive rod. In one embodiment, the part of the standoff 556 that would have projected beyond the face plate 536 is grinded down to be flush with the face plate 556. Therefore, the same parts can be used to make the both the drive drum bars 502 and the non-drive drum bars 504. The standoffs 556 on the non-drive drum bar 504 can still provide extended gaps between the face plate 536 and the support rib 538 throughout the length of the non-drive drum bar 504.

In one embodiment, a drive drum tower 500 comprises a plurality of drive drum bars 502 connected around an outer perimeter of the drive drum tower, wherein a drive rod 540 on a drive drum bar 502 is outward facing on the outer perimeter of the drive drum tower 500, wherein the drive drum bar 502 comprises: the drive rod 540; a face plate 536; and a support rib 538, wherein the support rib 538 is connected to the drive rod 540, and the face plate 536 is located between the drive rod 540 and the support rib 538, and the face plate 536 is separated from the drive rod 540.

In one embodiment of the drive drum tower 500, the drive drum tower 500 comprises non-drive drum bars 504 alternating with drive drum bars 502 around the outer perimeter of the drive drum tower 500, wherein a non-drive drum bar 504 comprises: a face plate 536; and a support rib 538, wherein the support rib 538 is connected to the face plate 536, and the non-drive drum bar 504 does not have a drive rod 540. In one embodiment, the support rib 538 is connected to the face plate 536 through standoffs 556.

In one embodiment of the drive drum tower 500, the drive rod 540 is straight in a front plane and sloping in a side plane, wherein a sloping section 548 is provided at a lower end of the drive rod 540.

In one embodiment of the drive drum tower 500, the drive drum tower 500 comprises a central post 506, and the drive drum bars 502 are connected on the drive drum tower 500 parallel to the central post 506.

In one embodiment of the drive drum tower 500, the support rib 538 of a drive drum bar 502 is connected to a plurality of rings 516, 522, 524, wherein the plurality of rings are connected to the central post 506.

In one embodiment of the drive drum tower 500, the rings 516, 522, 524 are made from angle steel having a vertex pointing outward, and the support rib 538 includes wedge cutouts 560, 562, 564 to match with the vertices of the rings 516, 522, 524.

In one embodiment of the drive drum tower 500, each of the rings 516, 522, 524 is connected to the central post 506 through radial arms 514, and the drive drum tower 500 further comprises vertical braces 526 or diagonal braces 528, 530 connected between the radial arms of one ring to a second ring.

In one embodiment of the drive drum tower 500, the drive drum tower 500 comprises standoffs 556, wherein the face plate 536 is separated from the drive rod 540 through standoffs 556.

In one embodiment of the drive drum tower 500, a standoff 556 has a step 558 that abuts against a hole 554 in the face plate 536.

In one embodiment of the drive drum tower 500, the support rib 538 is welded to the drive rod 540 and face plate 536 at the standoffs 556.

In one embodiment of the drive drum tower 500, the drive drum tower 500 comprises extended gaps between the drive rod 540 and face plate 536 throughout the length of the drive drum bar 502.

In one embodiment of the drive drum tower 500, the drive rod 540 has a circular or polygonal cross-sectional shape.

In one embodiment of the drive drum tower 500, the face plate 536 is made from channel steel.

In one embodiment, a drive drum bar 502 comprises: a drive rod 540; a face plate 536; and a support rib 538, wherein the support rib 538 is connected to the drive rod 540, and the face plate 536 is located between the drive rod 540 and the support rib 538, and the face plate 536 is separated from the drive rod 540.

In one embodiment of the drive drum bar 502, the drive rod 540 is straight in a front plane and sloping in a side plane, wherein a sloping section 548 is provided at an end of the drive rod 540.

In one embodiment of the drive drum bar 502, the drive drum bar 502 comprises standoffs 556, wherein the face plate 536 is separated from the drive rod 540 through standoffs 556

In one embodiment of the drive drum bar 502, a standoff 556 has a step 558 that abuts against a hole 554 in the face plate 536.

In one embodiment of the drive drum bar 502, the support rib 538 is welded to the drive rod 540 and face plate 536 at the standoffs 556.

In one embodiment of the drive drum bar 502, the drive rod 540 has a circular or polygonal cross-sectional shape.

In one embodiment of the drive drum bar 502, the face plate 536 is made from channel steel.

In one embodiment of the drive drum bar 502, the drive drum bar 502 comprises gaps between the face plate 536 and the support rib 538.

In one embodiment, a spiral conveyor comprises: a drive drum tower 500 comprises a plurality of drive drum bars 502 connected around an outer perimeter of the drive drum tower, wherein a drive rod 540 on a drive drum bar 502 is outward facing on the outer perimeter of the drive drum tower 500, wherein the drive drum bar 502 comprises: the drive rod 540; a face plate 536; and a support rib 538, wherein the support rib 538 is connected to the drive rod 540 through standoffs 556, and the face plate 536 is located between the drive rod 540 and the support rib 538, and the face plate 536 is separated from the drive rod 540, and a conveyor 20 having a lateral side engaged to the plurality of drive drum bars 502, wherein the conveyor 20 is arranged in a spiral around the drive drum tower 500.

In one embodiment, a drive drum bar 502 for a drive drum tower 500 comprises a drive rod 540; a face plate 536; and a support rib 538, wherein the support rib is connected to the drive rod, and the face plate is located between the drive rod and the support rib, and the face plate is separated from the drive rod, wherein the drive drum bar is capable of being attached to the outer perimeter of the drive drum tower, wherein the drive rod faces outwardly.

While illustrative embodiments have been illustrated and described, it will be appreciated that various changes can be made therein without departing from the spirit and scope of the invention.

The embodiments of the invention in which an exclusive property or privilege is claimed are defined as follows:

1. A drive drum tower, comprising:
a plurality of drive drum bars connected around an outer perimeter of the drive drum tower, wherein a drive rod on a drive drum bar is outward facing on the outer perimeter of the drive drum tower, wherein the drive drum bar comprises:
the drive rod;
a face plate; and
a support rib, wherein the support rib is connected to the drive rod, and the face plate is located between the drive rod and the support rib, and the face plate is separated from the drive rod.

2. The drive drum tower of claim 1, comprising non-drive drum bars alternating with drive drum bars around the outer perimeter of the drive drum tower, wherein a non-drive drum bar comprises:
a face plate; and
a support rib, wherein the support rib is connected to the face plate, and the non-drive drum bar does not have a drive rod.

3. The drive drum tower of claim 1, wherein the drive rod is straight in a front plane and sloping in a side plane, wherein a sloping section is provided at a lower end of the drive rod.

4. The drive drum tower of claim 1, comprising a central post, and the drive drum bars are connected on the drive drum tower parallel to the central post.

5. The drive drum tower of claim 4, wherein the support rib of a drive drum bar is connected to a plurality of rings, wherein the plurality of rings are connected to the central post.

6. The drive drum tower of claim 5, wherein the rings are made from angle steel having a vertex pointing outward, and the support rib includes wedge cutouts to match with the vertices of the rings.

7. The drive drum tower of claim 5, wherein each of the rings is connected to the central post through radial arms, and the drive drum tower further comprises vertical braces or diagonal braces connected between the radial arms of one ring to a second ring.

8. The drive drum tower of claim 1, comprising standoffs, wherein the face plate is separated from the drive rod through standoffs.

9. The drive drum tower of claim 8, wherein a standoff has a step that abuts against a hole in the face plate.

10. The drive drum tower of claim 8, wherein the support rib is welded to the drive rod and face plate at the standoffs.

11. The drive drum tower of claim 1, comprising extended gaps between the drive rod and face plate throughout the length of the drive drum bar.

12. The drive drum tower of claim 1, wherein the drive rod has a circular or polygonal cross-sectional shape.

13. The drive drum tower of claim 1, wherein the face plate is made from channel steel.

14. A drive drum bar, comprising:
a drive rod;
a face plate; and
a support rib, wherein the support rib is connected to the drive rod and the face plate is located between the drive rod and the support rib, and the face plate is separated from the drive rod.

15. The drive drum bar of claim 14, wherein the drive rod is straight in a front plane and sloping in a side plane, wherein a sloping section is provided at an end of the drive rod.

16. The drive drum bar of claim 14, comprising standoffs, wherein the face plate is separated from the drive rod through standoffs.

17. The drive drum bar of claim 16, wherein a standoff has a step that abuts against a hole in the face plate.

18. The drive drum bar of claim 16, wherein the support rib is welded to the drive rod and face plate at the standoffs.

19. The drive drum bar of claim 14, wherein the drive rod has a circular or polygonal cross-sectional shape.

20. The drive drum bar of claim 14, wherein the face plate is made from channel steel.

21. The drive drum bar of claim 14, comprising gaps between the face plate and the support rib.

22. The drive drum bar of claim 14, wherein the drive bar, face place and support rib are made from stainless steel.

23. A drive drum bar for a drive drum tower, comprising:
a drive rod;
a face plate; and
a support rib, wherein the support rib is connected to the drive rod, and the face plate is located between the drive rod and the support rib, and the face plate is separated from the drive rod, wherein the drive drum bar is capable of being attached to the outer perimeter of the drive drum tower, wherein the drive rod faces outwardly.

* * * * *